(12) United States Patent
Maus et al.

(10) Patent No.: US 12,139,084 B2
(45) Date of Patent: *Nov. 12, 2024

(54) VEHICLE-MOUNTED CRASH ATTENUATOR

(71) Applicant: TRAFFIX DEVICES, INC., San Clemente, CA (US)

(72) Inventors: Geoffrey B. Maus, Trabuco Canyon, CA (US); Ryan Selvius, Vista, CA (US)

(73) Assignee: TRAFFIX DEVICES, INC., San Clemente, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/926,869

(22) PCT Filed: Apr. 28, 2021

(86) PCT No.: PCT/US2021/029561
§ 371 (c)(1),
(2) Date: Nov. 21, 2022

(87) PCT Pub. No.: WO2021/222356
PCT Pub. Date: Nov. 4, 2021

(65) Prior Publication Data
US 2023/0192021 A1 Jun. 22, 2023

Related U.S. Application Data

(60) Provisional application No. 63/018,970, filed on May 1, 2020.

(51) Int. Cl.
*B60R 19/26* (2006.01)
*B60R 19/24* (2006.01)
(Continued)

(52) U.S. Cl.
CPC .............. *B60R 19/26* (2013.01); *B60R 19/24* (2013.01); *B60R 19/38* (2013.01); *E01F 15/148* (2013.01);
(Continued)

(58) Field of Classification Search
USPC .......................................................... 293/118
See application file for complete search history.

(56) References Cited

U.S. PATENT DOCUMENTS

| 3,907,353 A | 9/1975 | Dinitz |
| 5,052,732 A | 10/1991 | Oplet et al. |

(Continued)

FOREIGN PATENT DOCUMENTS

| CN | 112265488 A | 1/2021 |
| CN | 112319405 A | 2/2021 |

(Continued)

OTHER PUBLICATIONS

Office Action issued on Oct. 24, 2023 in connection with corresponding Japanese Pat. App No. 2022-563219.
(Continued)

*Primary Examiner* — Joseph D. Pape
(74) *Attorney, Agent, or Firm* — Stout, Uxa & Buyan, LLP; Donald E. Stout (57) ABSTRACT

A crash impact attenuator is adapted for deployment on a vehicle, and includes a cartridge portion having at least one energy absorbing module, as well as a backup system having a backup frame, which is adapted to attach the cartridge portion to the vehicle. The backup system includes an actuator configured to pivot the cartridge portion between a deployed orientation and a stored orientation about a pivot axis disposed on a lower half of the backup system. The backup system further includes a lockout frame member having a contact surface on one end thereof, the lockout frame member being actuatable between a deployed orientation wherein the contact surface engages a portion of the backup frame to support the backup frame against vehicular impact forces and a stowed orientation wherein the contact surface is not engaged with the backup frame.

18 Claims, 8 Drawing Sheets

(51) Int. Cl.
*B60R 19/38* (2006.01)
*E01F 15/14* (2006.01)
*B60R 19/00* (2006.01)
*B60R 19/18* (2006.01)

(52) U.S. Cl.
CPC . *B60R 2019/005* (2013.01); *B60R 2019/1893* (2013.01)

(56) References Cited

U.S. PATENT DOCUMENTS

| | | |
|---|---|---|
| 6,186,565 B1 | 2/2001 | Unrath |
| 6,581,992 B1 | 6/2003 | Gertz |
| 6,942,263 B2 | 9/2005 | Welch et al. |
| 7,438,337 B1 | 10/2008 | Gertz |
| 7,802,829 B2 | 9/2010 | Maus |
| 8,276,956 B2 | 10/2012 | Maus |
| 8,702,137 B2 | 4/2014 | Maus |
| 9,156,320 B2 | 10/2015 | Maus |
| 9,399,845 B2 | 7/2016 | Buehler |
| 2003/0077119 A1 | 4/2003 | Leonhardt |
| 2015/0069771 A1 | 3/2015 | Buehler |
| 2016/0167468 A1 | 6/2016 | Maus |

FOREIGN PATENT DOCUMENTS

| | | |
|---|---|---|
| KR | 10-1614601 B1 | 4/2016 |
| WO | 2017175105 A1 | 10/2017 |

OTHER PUBLICATIONS

International Search Report and Written Opinion dated Aug. 3, 2021 in connection with corresponding PCT App. No. PCT/US2021/029561.

Office action issued on Jan. 18, 2024 by CNIPA in corresponding App. No. 202180030286.6.

Extended European Search Report issued in corresponding App. No. 221797203.3 on Mar. 21, 2024.

VEHICLE-MOUNTED CRASH ATTENUATOR

BACKGROUND OF THE INVENTION

Field of the Invention

This invention relates to attenuators which are particularly adapted for the absorption of energy in the event of an impact between an errant vehicle and a second, typically stationary or slow-moving vehicle, in the hope of minimizing injury to the occupants of both vehicles, and, more specifically, to vehicle-mounted crash attenuators. Such crash attenuators are disclosed in commonly assigned U.S. Pat. No. 6,581,992, entitled Truck Mounted Crash Attenuator, and U.S. Pat. No. 7,438,337, entitled Vehicular Crash Attenuator, which are each herein expressly incorporated by reference, in their entirety.

While the Applicant has sold many of the attenuators described and claimed in the aforementioned patents under the registered trademark SCORPION, development has been ongoing on the products to ensure that they meet and exceed always-evolving government crash test standards and are adapted to a wide variety of roadwork applications. The invention described and claimed herein provides improvements designed to make an outstanding product even more useful in metropolitan and urban areas where space and roadway clearance may be at a premium, though, of course, the described systems may be used in any suitable application.

SUMMARY OF THE INVENTION

The invention, together with additional features and advantages thereof, may best be understood by reference to the following description taken in conjunction with the accompanying illustrative drawing.

In one aspect of the invention, a crash impact attenuator is provided which adapted for deployment on a vehicle, and comprises a cartridge portion comprising at least one energy absorbing module, as well as a backup system having a backup frame, which is adapted to attach the cartridge portion to the vehicle. The backup system comprises an actuator configured to pivot the cartridge portion between a deployed orientation and a stored orientation about a pivot axis disposed on a lower half of the backup system. The backup system further comprises an innovative lockout frame member having a contact surface on one end thereof, the lockout frame member being actuatable between a deployed orientation wherein the contact surface engages a portion of the backup frame and a stowed orientation wherein the contact surface is not engaged with the backup frame.

In the illustrated embodiments, the cartridge portion is horizontal when in its deployed orientation and vertical when in its stowed orientation. The lockout frame member is horizontal when in its deployed orientation and vertical when in its stowed orientation. The backup frame pivots between a vertical orientation, when the cartridge portion is in its deployed orientation and a horizontal orientation when the cartridge portion is in its stowed orientation.

The portion of the backup frame contacted by the lockout frame member contact surface is located above the pivot axis. This arrangement permits the backup frame to be reinforced in the event of a vehicular impact, so that it does not collapse about the pivot axis under the force of the impact. In the illustrated embodiment, the pivot axis is located below the location of a resolved force created by an impacting vehicle, while the contact engagement between the backup frame and the lockout frame member is located above the location of the resolved impact force.

The lockout frame member contact surface may be adjustable in order to optimize engagement with the backup frame. For example, the lockout frame member contact surface may comprise an adjustable bolt head which may be threaded to extend or reduce the length of the lockout frame member.

A second lockout frame member is present in the illustrated embodiment, having a second contact surface adapted to engage a second portion of the backup frame. This provides a more uniform reinforcement across the width of the backup frame. The number of lockout frame members may be optimized to suit different circumstances and operating conditions. As noted above, the portion of the backup frame contacted by the lockout frame member contact surface is located on an upper half of the backup frame.

In another aspect of the invention, there is described a method of deploying a crash impact attenuator disposed on a rear portion of a host vehicle. The method comprises pivoting a backup frame joining a cartridge portion of the crash impact attenuator to the host vehicle from a horizontal orientation to a vertical orientation and simultaneously pivoting the cartridge portion from a stowed orientation to a deployed orientation, wherein the cartridge portion extends horizontally behind the rear portion of the host vehicle. The pivoting of the backup frame and cartridge portion occurs about a pivot axis disposed along a lower half of the backup frame. A further method step comprises moving a lockout frame member from a stowed orientation to a deployed orientation, so that a contact surface on one end of the lockout frame member engages a portion of the backup frame.

In the described method, the step of pivoting the backup frame is performed prior to the step of moving the lockout frame member. A further step may comprise adjusting a position of the contact surface to optimize engagement with the portion of the backup frame, which step may be performed by threading a bolt head to extend or reduce a length of the lockout frame member.

The step of moving the lockout frame member may further comprise moving a second lockout frame member, so that a second contact surface on one end of the second lockout frame member engages a second portion of the backup frame.

The step of moving the lockout frame member may comprise pivoting the lockout frame member from its stowed position, which is vertical, to its deployed position, which is horizontal. As noted above, the portion of the backup frame engaged by the contact surface of the lockout frame member is located above the pivot axis.

DETAILED DESCRIPTION OF THE INVENTION

Figure 1:
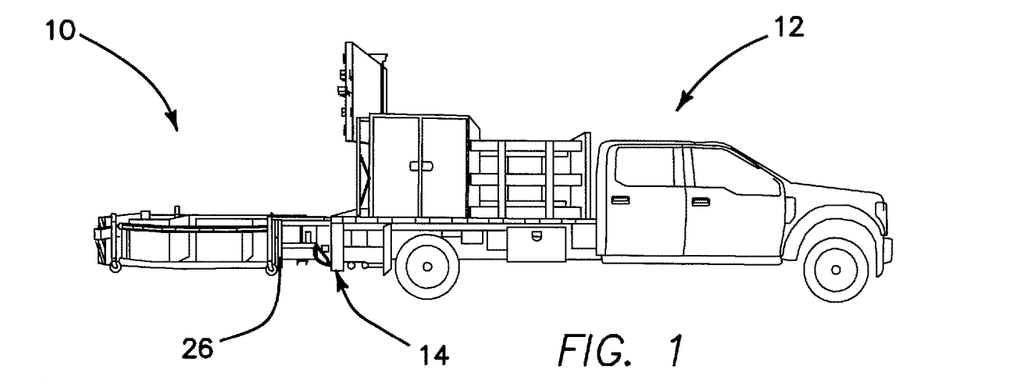
FIG. 1 is a side view of a vehicle, such as a truck, which is equipped with an exemplary embodiment of a vehicle-mounted crash attenuator constructed in accordance with the principles of the present invention.
Figure 2:
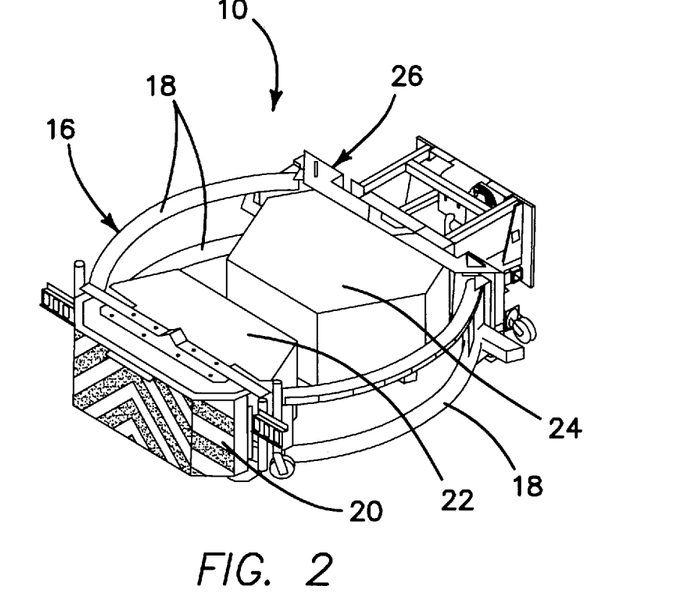
FIG. 2 is a perspective view of an exemplary embodiment of the vehicle-mounted crash attenuator shown in FIG. 1.
Figure 3:
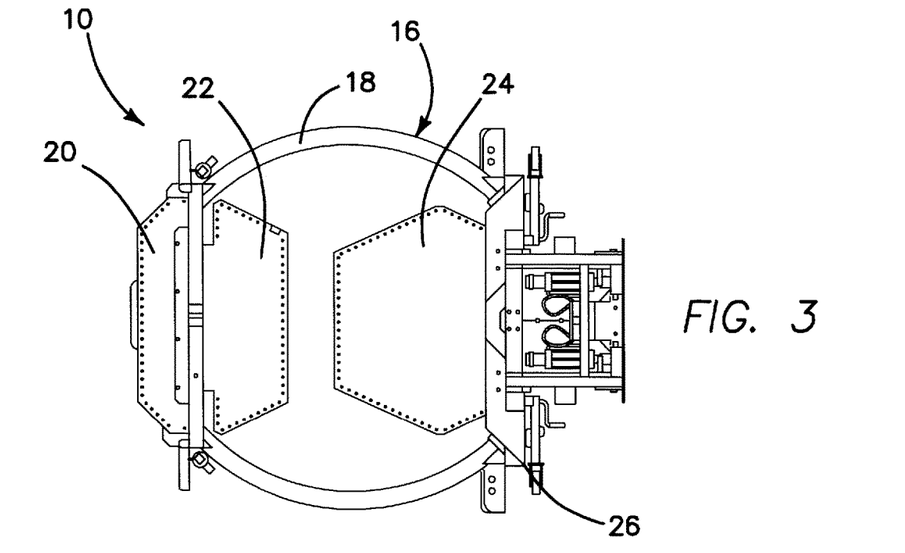
FIG. 3 is a top view of the crash attenuator shown in FIG. 2.
Figure 4:
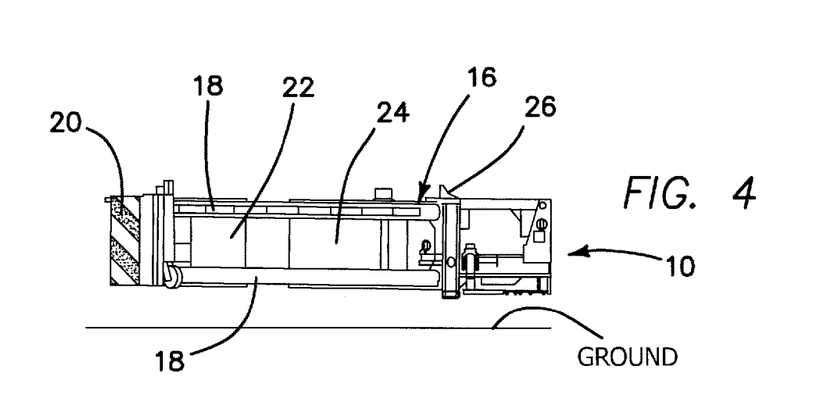
FIG. 4 is a side view of the crash attenuator shown in FIGS. 2-3.
Figures 6, 7, 8:
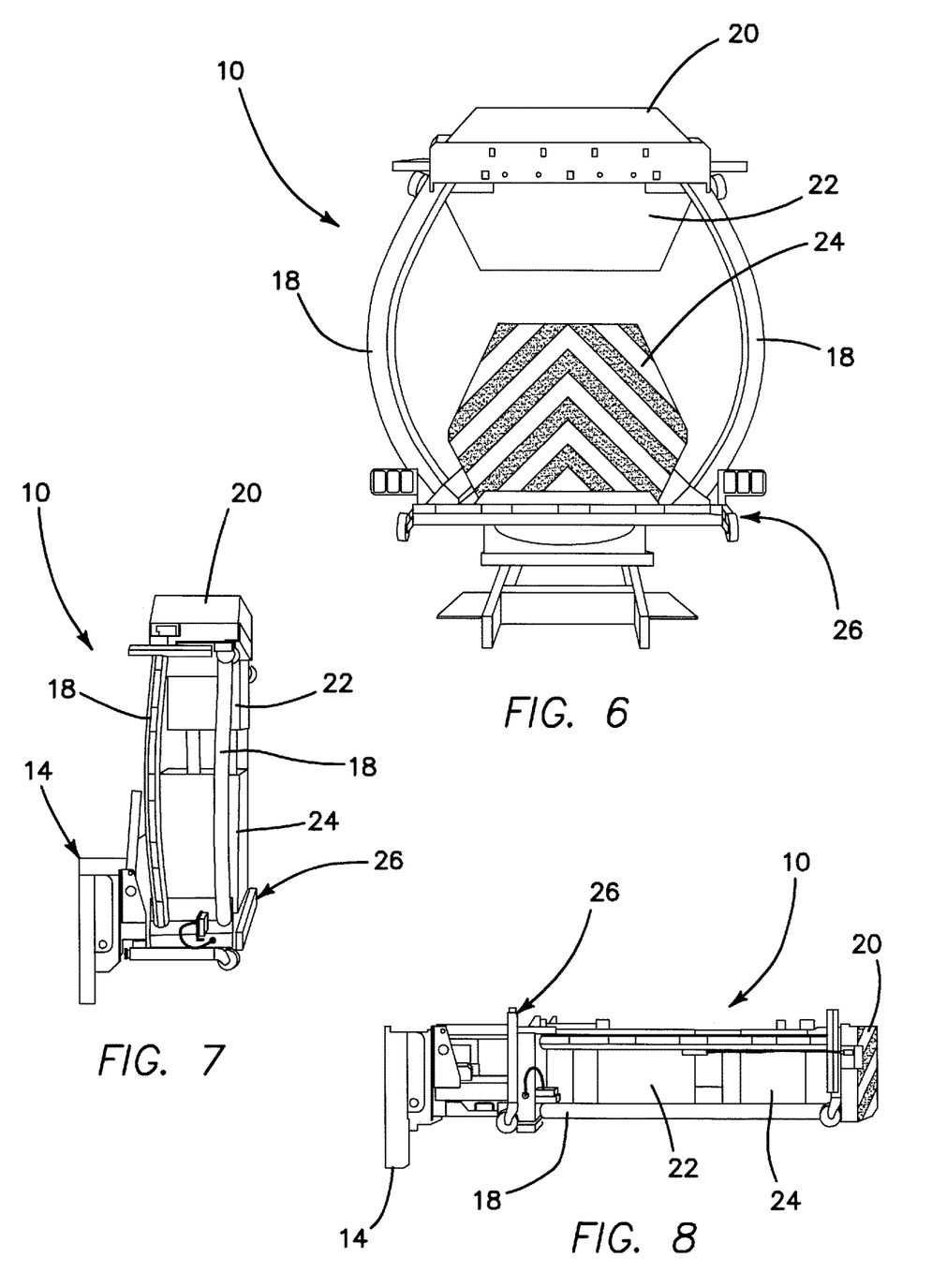
FIG. 6 is a rear view of the crash attenuator shown in FIGS. 2-6, in an upright storage or transport orientation.
FIG. 7 is a side view of the crash attenuator of FIG. 6, again in the upright storage or transport orientation.
FIG. 8 is a side view of the crash attenuator of FIGS. 6 and 7, in a horizontal deployed orientation.

Referring now to the figures, wherein like reference numerals refer to like elements throughout the figures, there is shown in FIG. 1 an exemplary embodiment of a vehicle-mounted crash attenuator 10, constructed in accordance with the principles of the present invention, attached to the rear 14 of a vehicle or truck 12. In FIG. 1, the crash attenuator 10 is shown in its horizontal deployed orientation, as is also the case in FIG. 8. In FIGS. 6 and 7, the crash attenuator 10 is shown in its upright storage or transport orientation.

FIGS. 2-8 illustrate the constructional details of the exemplary illustrated crash attenuator 10. The crash attenuator 10 is similar in many respects to that disclosed in commonly assigned U.S. Pat. No. 6,581,992 (the '992 Patent), already expressly incorporated herein by reference, except that it is more compactly designed, which is particularly advantageous particularly for applications in congested metropolitan or urban areas, where roadway space is at a premium and tighter turning radii are required or at least preferred. More particularly, while the crash attenuator in the '992 Patent comprises both a strut portion 116 and a cartridge portion 118, as shown, for example, in FIG. 10 of the '992 Patent, the crash attenuator 10 of the present invention comprises only a cartridge portion 16, meaning that the length of the attenuator 10 is reduced to about 8 feet, as opposed to about 13 feet in other versions of the crash attenuator disclosed, for example, in the '992 Patent. The crash attenuator 10 may be utilized with a host vehicle 12 of as little as 7000-7500 lb. (approximately 3200-3500 kg), giving up to 50 MPH (80 KPH) protection with smaller host vehicles.

FIGS. 6-8 show the crash attenuator 10 in its horizontal, deployed orientation (FIG. 8) and in its vertical, stored orientation (FIGS. 6 and 7), wherein the cartridge portion is elevated to an approximately 90 degree angle relative to the orientation of the vehicle (a "single 90-degree fold"). Actuators are provided as part of the backup system 26 for pivoting the cartridge portion 16 and associated components between its deployed and stored orientations.

The cartridge portion 16 comprises a pair of vertically spaced curved members 18, which in exemplary embodiments comprise aluminum tubing, such as tubing having a 4½ inch diameter, though other materials, sizes, and configurations having suitable similar properties can be used. Mounted on the cartridge portion 16 are energy-absorbing modules 20, 22, and 24. These modules, in exemplary embodiments, are constructed to comprise aluminum honeycomb material disposed in environmentally sealed aluminum containers. The aluminum honeycomb material may comprise 1 inch cells in modules 22 and 24, and ½ inch cells in module 20. Of course, alternative materials and cell sizes may be selected, if desired. The honeycomb material may include spaced holes stamped in the middle of the assembly, for venting air trapped in the honeycomb, which has been found to improve stability when an onset force is applied to the crash attenuator 10.

The crash attenuator 10 is adapted for attachment to a backup system 26 disposed on the rear end 14 of the vehicle 12. The backup system 26, in exemplary embodiments, is constructed of a rigid material such as steel, but can be made of other similar materials as well.

Figure 5:
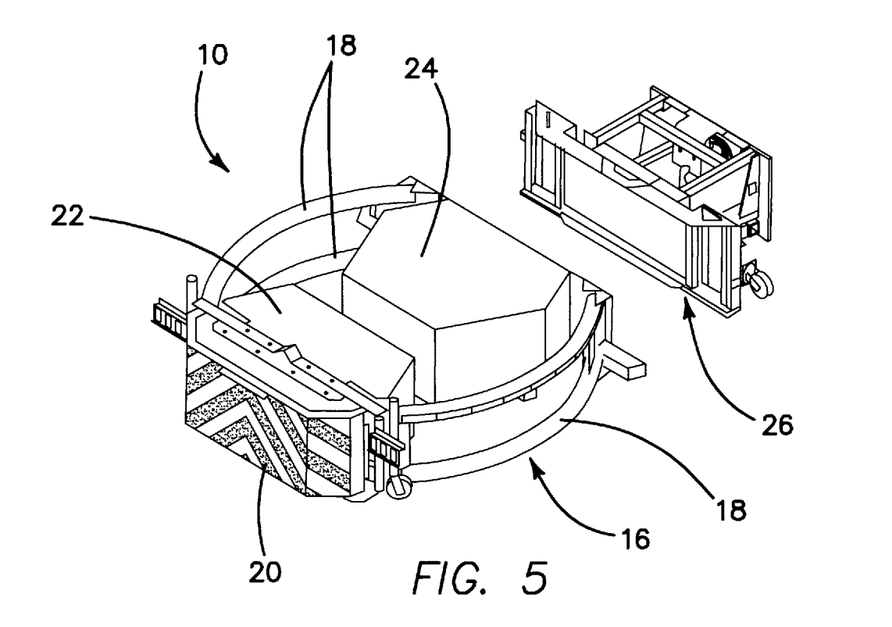
FIG. 5 is a perspective view, wherein the crash attenuator is illustrated as being disassembled from the backup system for securing the crash attenuator to a vehicle.

In FIG. 5, a first type of backup system 26 is illustrated for use with the cartridge portion 16. This first type of backup system 26 is a "low-pivot" backup system, and will be described further hereinbelow, in conjunction with a description of FIGS. 10-14. The system may also be used with a "high-pivot" backup system, of a type more like those used, for example, in the systems shown in the '992 Patent.

Figure 9:
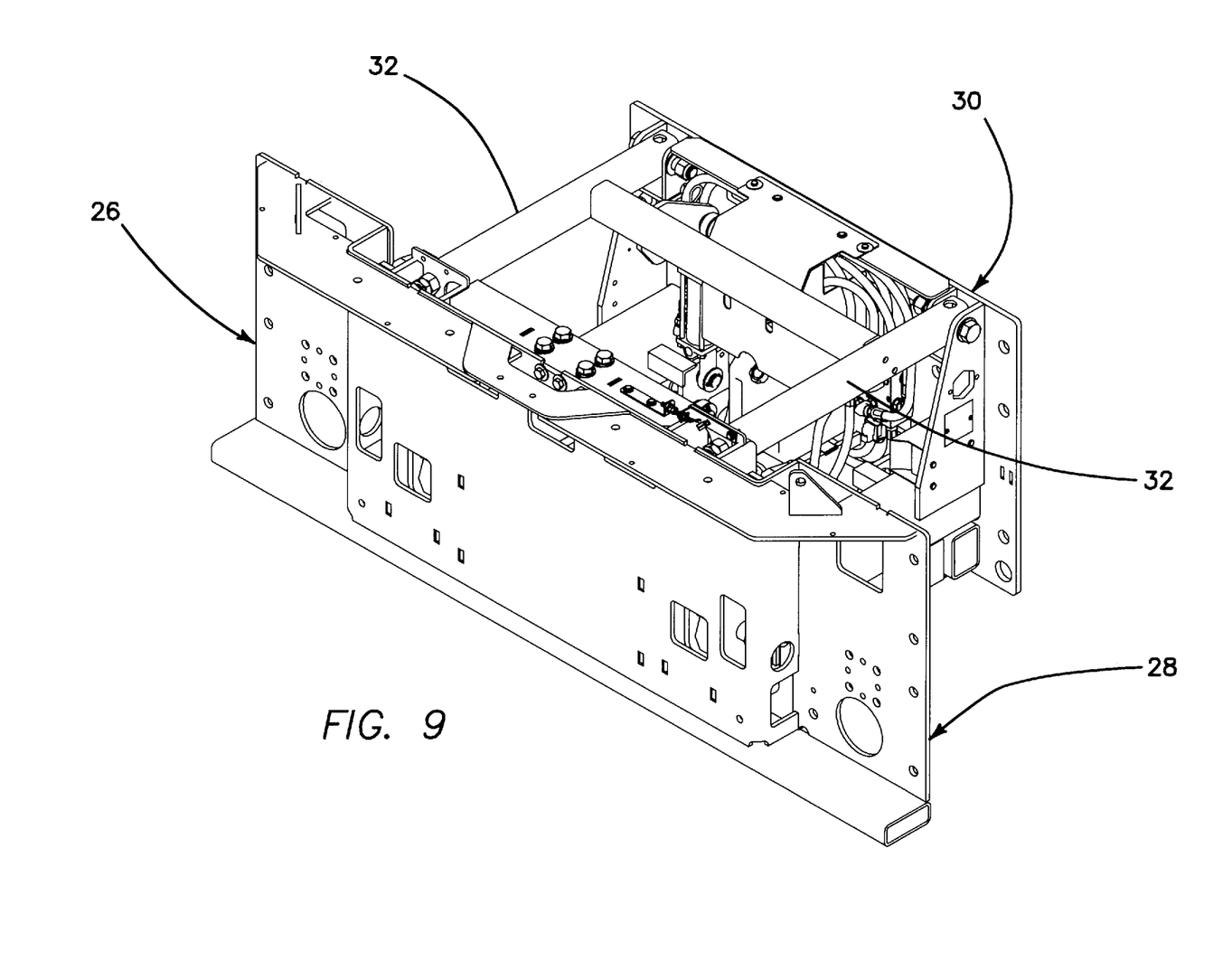
FIG. 9 is an isometric view of an exemplary embodiment of a bottom pivot attenuator mounting system or backup system, such as the backup system shown in FIG. 5, for use in the crash attenuator system of the present invention.

A particular advantage of the inventive low-pivot backup system 26, as shown in FIGS. 5 and 9-13, is that it advantageously permits stored vertical height of the system 10, as shown in FIGS. 7 and 9, to be under 10 feet, whereas with a high-pivot backup system, the stored vertical height of the system 10 is over 11 feet. Additionally, Applicant has advantageously found that the inventive low-pivot backup system operates to inhibit underride of an impacting vehicle beneath the crash attenuator 10, which can otherwise be particularly dangerous to occupants of the impacting vehicle.

Figure 10:
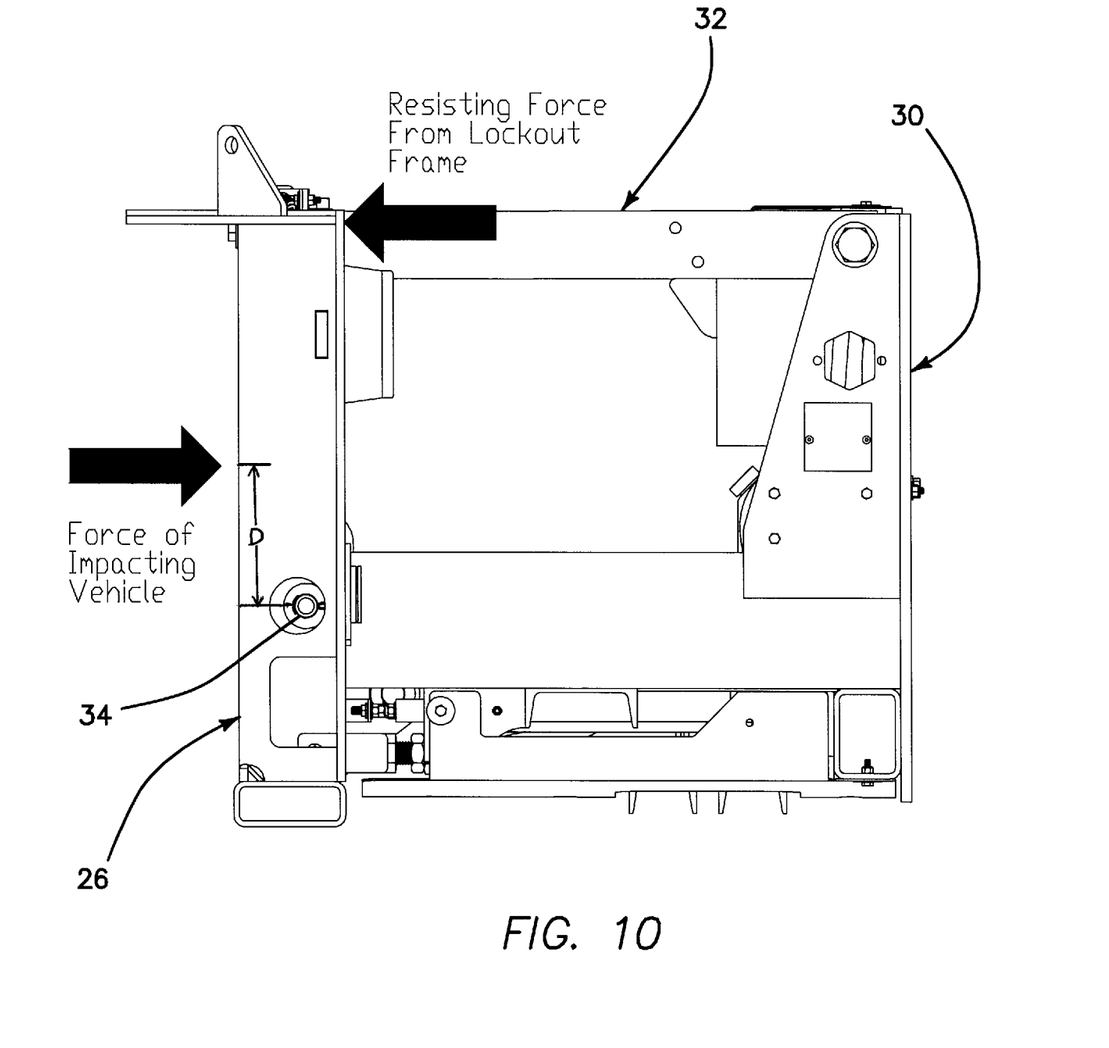
FIG. 10 is a schematic view of the backup system shown in FIG. 9 in a deployed position.
Figure 11:
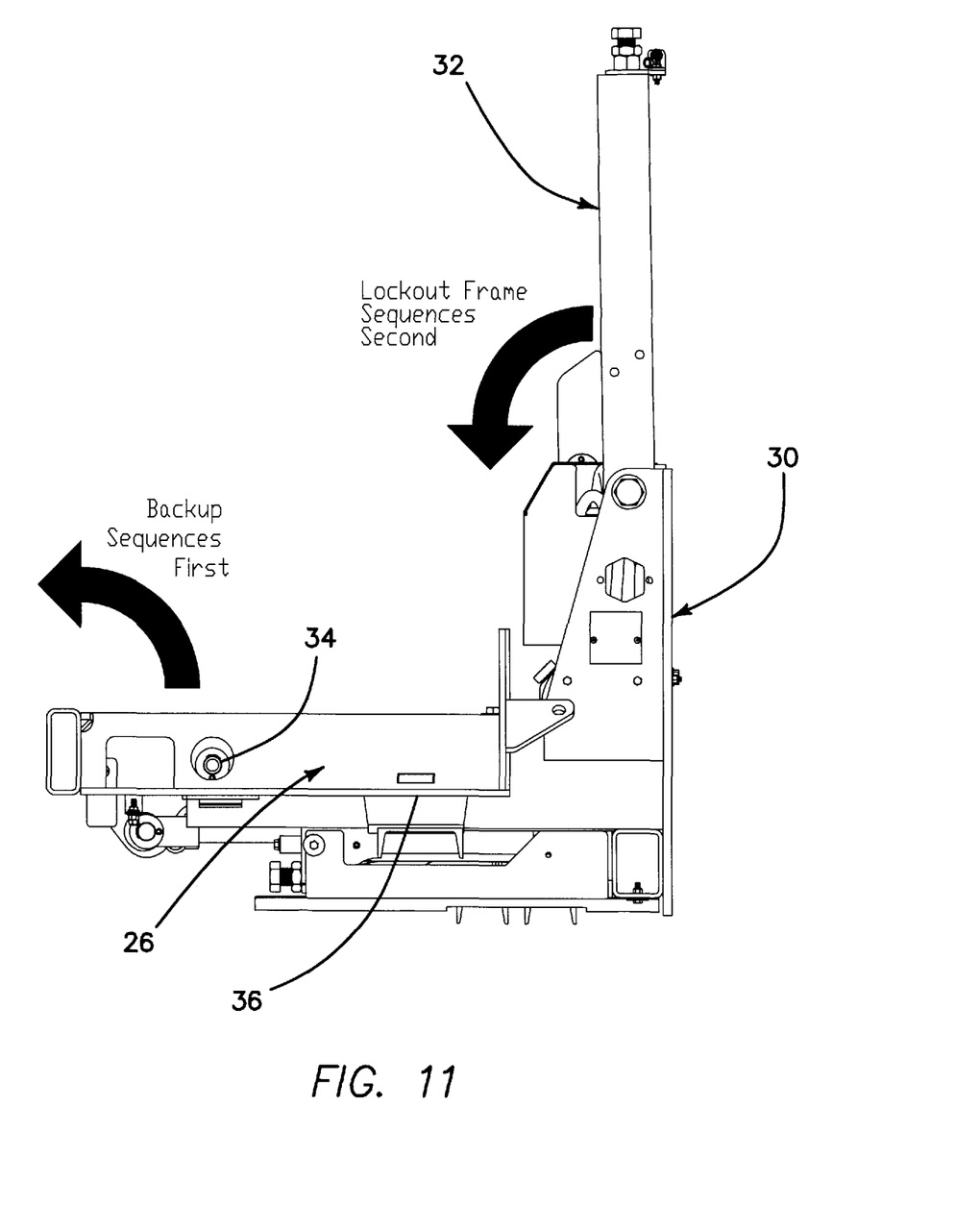
FIG. 11 is a schematic view of the backup system shown in FIGS. 9 and 10, in a stowed position.
Figure 12:
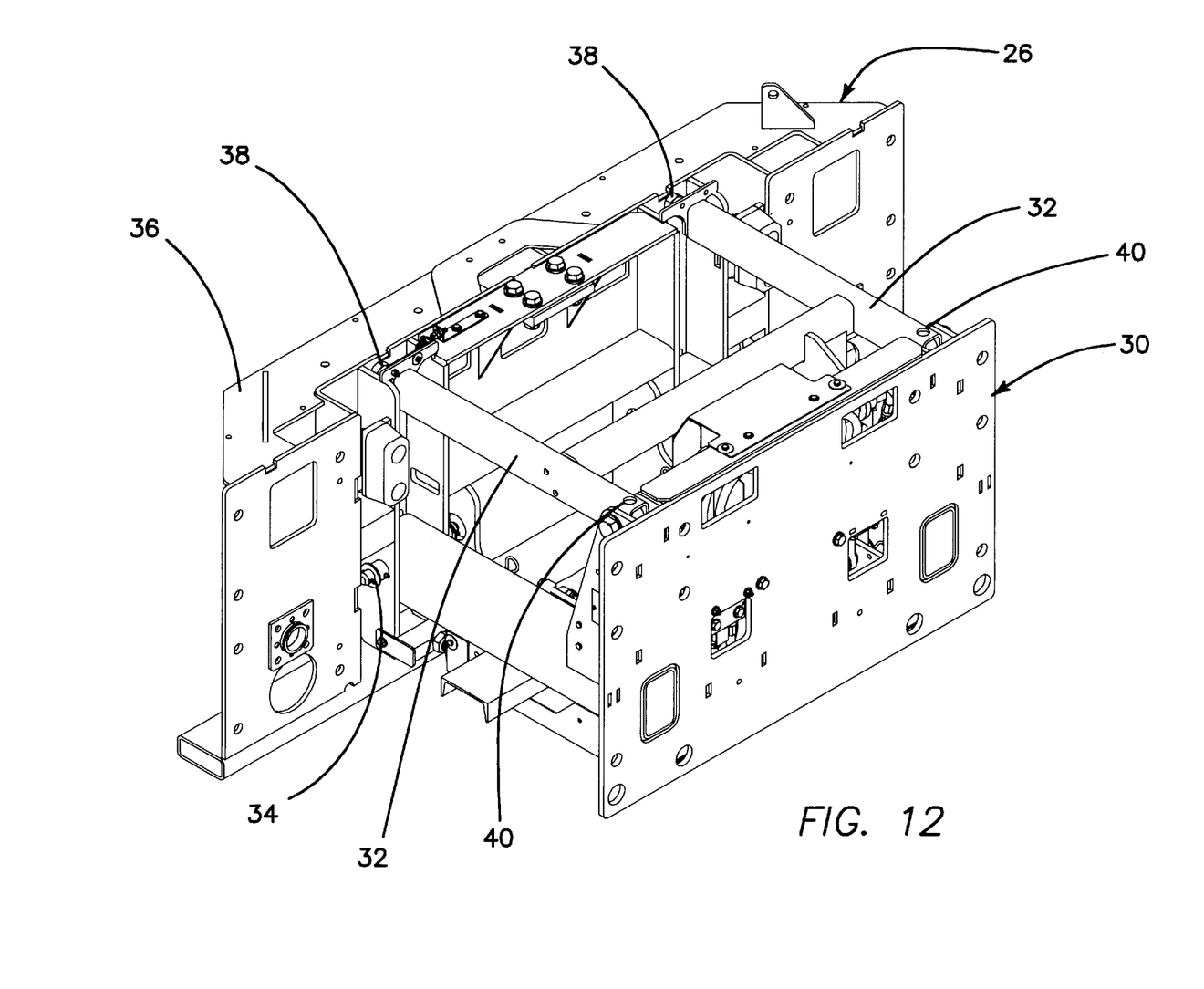
FIG. 12 is a schematic isometric view of the backup system shown in FIGS. 9-11, from a reverse orientation respective to that of FIG. 9.
Figure 13:
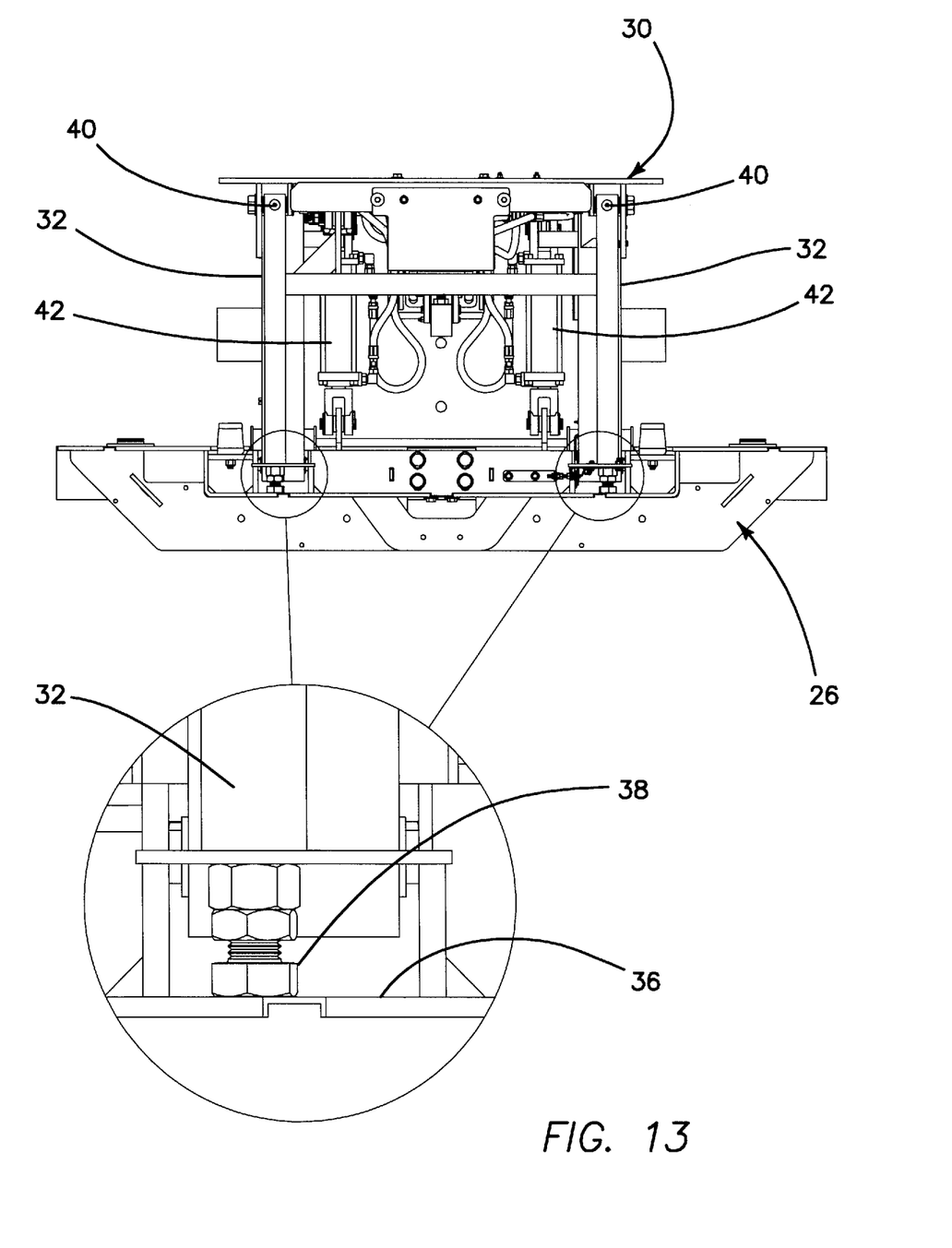
FIG. 13 is a schematic illustration from above of the backup system shown in FIGS. 9-12, including detail sections of the lockout frame contact surfaces.

Now with reference particularly to FIGS. 9-13, the low-pivot backup system 26 is illustrated in greater detail. The backup system 26 comprises a backup frame 28, for attachment to the crash attenuator 10, a truck side frame 30, for attachment to a truck/vehicle 12, and anti-underride lockout frame members 32. FIG. 10 illustrates the backup system 26 in its deployed orientation, while FIG. 11 illustrates the backup system 26 in its stowed orientation.

In operation, when deploying the crash attenuator 10 from the stowed position shown in FIG. 11 to the deployed position shown in FIG. 10, the backup frame 28 of the backup system 26 is moved by actuator system 42 from the horizontal orientation shown in FIG. 11 to the vertical orientation shown in FIG. 10, pivoting about the pivot axis 34, as shown by the arrow in FIG. 11. Once the backup frame 28 is upright, the anti-underride lockout frame members 32 are actuated from their stowed vertical orientation shown in FIG. 11 to the horizontal orientation shown in FIG. 10, about the pivot joints 40, as shown by the second arrow in FIG. 11. When the lockout frame members 32 are in their deployed horizontal orientations, bolt heads 38 on the end of each frame member 32 engage the backup frame 28, to provide a resisting force against the force of an impacting vehicle, as shown by the arrows in FIG. 10. The bolt heads may be adjusted, using the threaded engagement with the bolt, to optimize the engagement. The lockout frame arms 32 provide two points of contact with the backup frame directly above the pivot points 34.

The force with which a vehicle strikes the crash attenuator is generally located some distance "D" (FIG. 10) above the pivot axis of the mounting system. If the lockout frame were not present, an angular acceleration would be developed about the pivot axis, which would cause the backup frame and system to rotate. This rotation would then allow the impact surface of the attenuator to lift, and thus potentially allow the impacting vehicle to underride. The lockout frame 32 provides a resisting force that does not allow this rotation to occur.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A crash impact attenuator adapted for deployment on a vehicle, comprising:
   a cartridge portion comprising at least one energy absorbing module; and
   a backup system having a backup frame and being adapted to attach the cartridge portion to the vehicle, comprising an actuator configured to pivot the cartridge portion between a deployed orientation and a stored orientation about a pivot axis disposed on a lower half of the backup system, the backup system further comprising a lockout frame member having a contact surface on and extending across one end thereof, the lockout frame member being actuatable between a deployed orientation wherein the contact surface directly engages a portion of the backup frame but is not joined or connected to the backup frame by any fasteners and a stowed orientation wherein the contact surface is not engaged with the backup frame and is not connected to the backup frame;
   wherein the backup frame pivots between a vertical orientation, when the cartridge portion is in its deployed orientation and a horizontal orientation when the cartridge portion is in its stowed orientation, and the lockout frame member pivots between a vertical orientation, when the cartridge portion is in its stowed orientation, and a horizontal orientation, when the cartridge portion is in its deployed orientation.

2. The crash impact attenuator as recited in claim 1, wherein the cartridge portion is horizontal when in its deployed orientation and vertical when in its stowed orientation.

3. The crash impact attenuator as recited in claim 1, wherein the portion of the backup frame contacted by the lockout frame member contact surface is located above the pivot axis.

4. The crash impact attenuator as recited in claim 1, wherein the lockout frame member contact surface is adjustable in order to optimize engagement of the contact surface with the backup frame.

5. The crash impact attenuator as recited in claim 4, wherein the lockout frame member contact surface comprises an adjustable bolt head.

6. The crash impact attenuator as recited in claim 1, and further comprising a second lockout frame member having a second contact surface adapted to engage a second portion of the backup frame.

7. The crash impact attenuator as recited in claim 1, wherein the portion of the backup frame contacted by the lockout frame member contact surface is located on an upper half of the backup frame.

8. A method of deploying a crash impact attenuator disposed on a rear portion of a host vehicle, comprising:
   pivoting a backup frame joining a cartridge portion of the crash impact attenuator to the host vehicle from a horizontal orientation to a vertical orientation and simultaneously pivoting the cartridge portion from a stowed orientation to a deployed orientation, wherein the cartridge portion extends horizontally behind the rear portion of the host vehicle, the pivoting of the backup frame and cartridge portion occurring about a pivot axis disposed along a lower half of the backup frame; and
   moving a lockout frame member from a stowed orientation to a deployed orientation, so that a contact surface disposed across one end of the lockout frame member directly engages a portion of the backup frame without fastening the contact surface or any other portion of the lockout frame member to the backup frame.

9. The method as recited in claim 8, wherein the step of pivoting the backup frame is performed prior to the step of moving the lockout frame member.

10. The method as recited in claim 8, and further comprising a step of adjusting a position of the contact surface to optimize engagement with the portion of the backup frame.

11. The method as recited in claim 10, wherein the adjusting step is performed by threading a bolt head to extend or reduce a length of the lockout frame member.

12. The method as recited in claim 8 wherein the step of moving the lockout frame member further comprises moving a second lockout frame member, so that a second contact surface disposed across one end of the second lockout frame member directly engages a second portion of the backup frame.

13. The method as recited in claim 8, wherein the step of moving the lockout frame member comprises pivoting the lockout frame member from its stowed position, which is vertical, to its deployed position, which is horizontal.

14. The method as recited in claim 8, wherein the portion of the backup frame engaged by the contact surface of the lockout frame member is located above the pivot axis.

15. A crash impact attenuator adapted for deployment on a vehicle, comprising:
   a cartridge portion comprising at least one energy absorbing module; and
   a backup system having a backup frame and being adapted to attach the cartridge portion to the vehicle, comprising an actuator configured to pivot the cartridge portion between a deployed orientation and a stored orientation about a pivot axis disposed on a lower half of the backup system, the backup system further comprising a lockout frame member having a contact surface on one end thereof, the lockout frame member being actuatable between a deployed orientation wherein the contact surface engages a portion of the backup frame and a stowed orientation wherein the contact surface is not engaged with the backup frame;
   wherein the lockout frame member contact surface is adjustable in order to optimize engagement with the backup frame.

16. The crash impact attenuator as recited in claim 15, wherein the lockout frame member contact surface comprises an adjustable bolt head.

17. A method of deploying a crash impact attenuator disposed on a rear portion of a host vehicle, comprising:
   pivoting a backup frame joining a cartridge portion of the crash impact attenuator to the host vehicle from a horizontal orientation to a vertical orientation and simultaneously pivoting the cartridge portion from a stowed orientation to a deployed orientation, wherein the cartridge portion extends horizontally behind the rear portion of the host vehicle, the pivoting of the backup frame and cartridge portion occurring about a pivot axis disposed along a lower half of the backup frame;

moving a lockout frame member from a stowed orientation to a deployed orientation, so that a contact surface on one end of the lockout frame member engages a portion of the backup frame; and adjusting a position of the contact surface to optimize engagement with the portion of the backup frame.

18. The method as recited in claim 17, wherein the adjusting step is performed by threading a bolt head to extend or reduce a length of the lockout frame member.

* * * * *